(12) United States Patent
Srinivas et al.

(10) Patent No.: US 7,500,248 B2
(45) Date of Patent: Mar. 3, 2009

(54) SYSTEMS AND METHODS FOR IMPLEMENTING AGGREGATION CONTAINERS

(75) Inventors: Kasy Srinivas, Sammamish, WA (US); Barend Hermanus Venter, Issaquah, WA (US); C. Douglas Hodges, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 570 days.

(21) Appl. No.: 10/426,401

(22) Filed: Apr. 29, 2003

(65) Prior Publication Data

US 2004/0221293 A1    Nov. 4, 2004

(51) Int. Cl.
G06F 9/44 (2006.01)
G06F 9/45 (2006.01)

(52) U.S. Cl. .................. 719/315; 719/316; 719/330; 717/107; 717/108

(58) Field of Classification Search ............ 719/315, 719/316, 330; 717/106–108
See application file for complete search history.

(56) References Cited

U.S. PATENT DOCUMENTS

| | | | |
|---|---|---|---|
| 6,243,764 B1 * | 6/2001 | Leach et al. | 719/316 |
| 6,256,780 B1 * | 7/2001 | Williams et al. | 717/107 |
| 6,263,492 B1 * | 7/2001 | Fraley et al. | 717/107 |
| 6,412,020 B1 * | 6/2002 | Leach et al. | 719/316 |
| 6,449,659 B1 * | 9/2002 | Caron et al. | 719/315 |
| 6,502,103 B1 * | 12/2002 | Frey et al. | 707/103 R |
| 6,968,538 B2 * | 11/2005 | Rust et al. | 717/108 |
| 2002/0156758 A1 * | 10/2002 | Cote et al. | 707/1 |
| 2003/0056023 A1 * | 3/2003 | Cole et al. | 709/315 |
| 2003/0177182 A1 * | 9/2003 | Clark et al. | 709/203 |
| 2004/0143625 A1 * | 7/2004 | Sheinis et al. | 709/202 |

OTHER PUBLICATIONS

Merriam-Webster's Collegiate Dictionary, Tenth Dictionary, definition of the word "decorate", p. 300.*
Shannon Pahl, "Understanding Enterprise Services (COM+) in .NET", Apr. 2002, 17 pages.*

* cited by examiner

*Primary Examiner*—Li B Zhen
(74) *Attorney, Agent, or Firm*—Lee & Hayes, PLLC

(57) ABSTRACT

A container object decorated with a proxy attribute is intercepted when instantiated at runtime, and a component that is an instance of a type dynamically created at runtime is returned, which implements interfaces corresponding to each of the individual interfaces of the objects extended in the container object by delegating to the extended objects. Alternately, a similar container object, when instantiated at runtime, would return a proxy object which contains a lookup table that maps interfaces to the extended objects within the component. The proxy object intercepts all calls to the container object and redirects them appropriately to the proxy objects corresponding to the extended objects, which may in turn redirect calls appropriately.

4 Claims, 8 Drawing Sheets

SYSTEMS AND METHODS FOR IMPLEMENTING AGGREGATION CONTAINERS

FIELD OF THE INVENTION

The present invention is directed toward implementation reuse in managed code and, more specifically, to systems and methods for achieving multiple inheritance without the code clutter incurred using existing delegation techniques. The invention, however, is not limited to use in managed code; on the contrary, the invention could be used in any programming environment where multiple implementation inheritance, a type of multiple implementation reuse, is not allowed as those of sufficient skill in the relevant art will understand and appreciate.

BACKGROUND OF THE INVENTION

The Component Object Model (COM) is the Microsoft Corporations framework for developing and supporting program component objects that provides a framework for the interoperation of objects. COM provides the underlying services of interface negotiation, life cycle management (determining when a component can be removed from a system), and related services. Moreover, the COM software architecture allows components made by different software vendors to be combined into a variety of applications. In summary, COM defines a standard for component interoperability, is not dependent on any particular programming language, is available on multiple platforms, and is extensible.

In COM, like other object-oriented programming models, an object (known as an container object) can reuse and extend functionality from other objects. This ability, in turn, speeds up program development and is one of the key benefits of software componentization. COM supports two forms of object reuse, aggregation and delegation, and each form can extend a single object or multiple objects into the logical construct of a container object.

Managed code (that is, code developed for Microsoft's .NET framework) does not allow multiple implementation inheritance, a type of multiple implementation reuse, and thus, in the context of multiple inheritance, managed code cannot aggregate multiple objects within a single container object directly. Instead, managed code objects can only achieve multiple inheritance using the delegation technique (that is, multiple interface inheritance), or indirect inheritance. This delegation technique, however, results in unavoidable code clutter, and the industry to date has not adequately addressed this shortcoming in the art.

SUMMARY OF THE INVENTION

The present invention is directed toward implementation reuse in managed code. More specifically, the present invention provides systems and methods for achieving multiple inheritance without the code clutter incurred using delegation.

In one embodiment of the present invention, a container object is decorated with a proxy attribute that allows intercepting the creating of the object and attributes that specify the objects to be extended within the container object. When the container object is instantiated at runtime, a component that is an instance of a type dynamically created at runtime is returned, which implements interfaces corresponding to each of the individual interfaces of the objects extended in the container object by delegating to the extended objects. In this manner, each interface is directly tied to an extended object in the component.

In another embodiment of the present invention, a container object is decorated with a proxy attribute that allows intercepting object instantiation, and the attributes that specify the objects to be extended within the container object. When the container object is instantiated at runtime, a proxy object is returned which contains a lookup table that maps interfaces to the extended objects within the component. The proxy object intercepts all calls to the container object and redirects them appropriately to the proxy objects corresponding to the extended objects, which may in turn redirect calls appropriately. This scheme allows for general implementation reuse that is not restricted to interface implementation reuse.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Computer Environment

Figure 1:
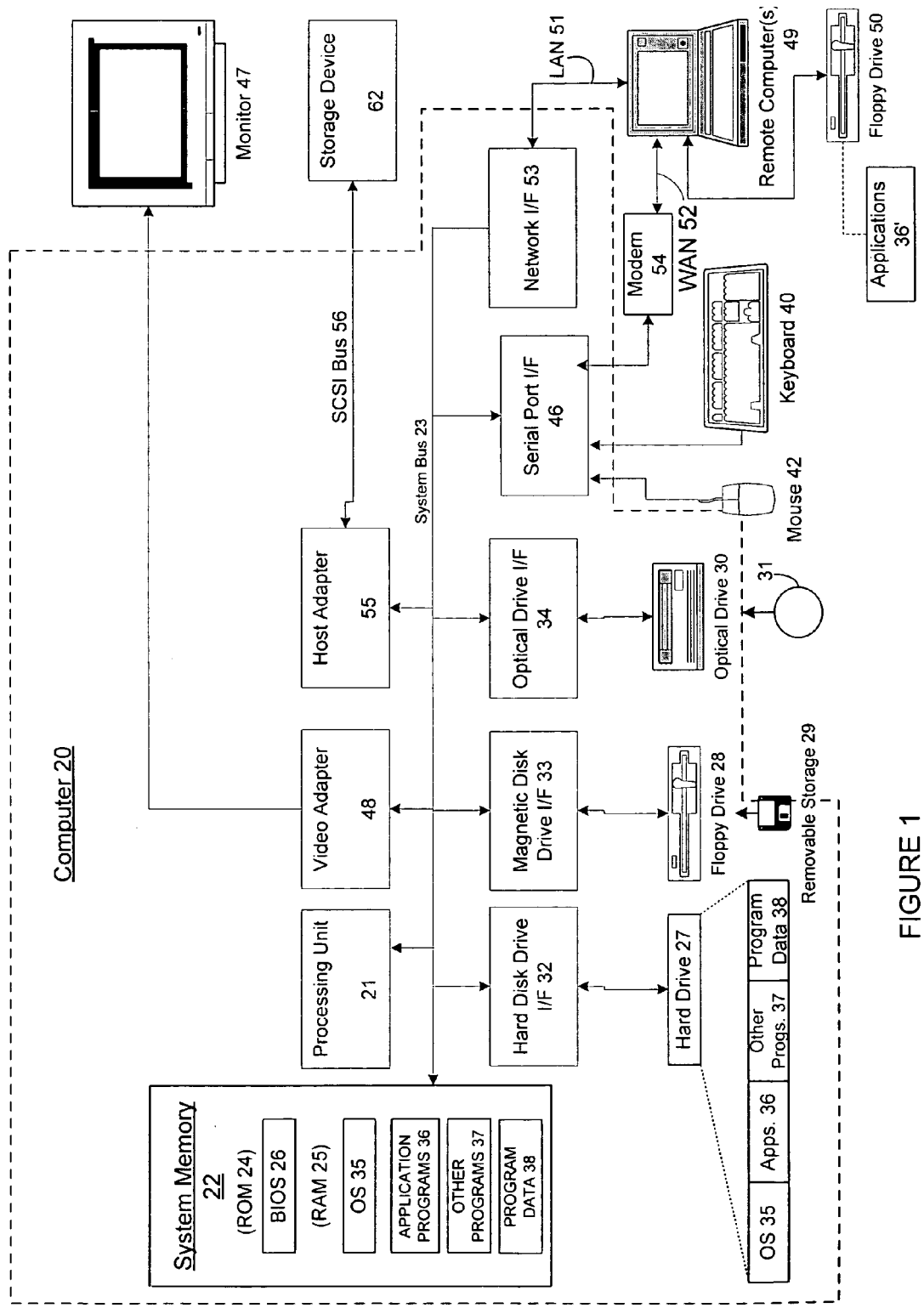
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Network Environment

Figure 2:
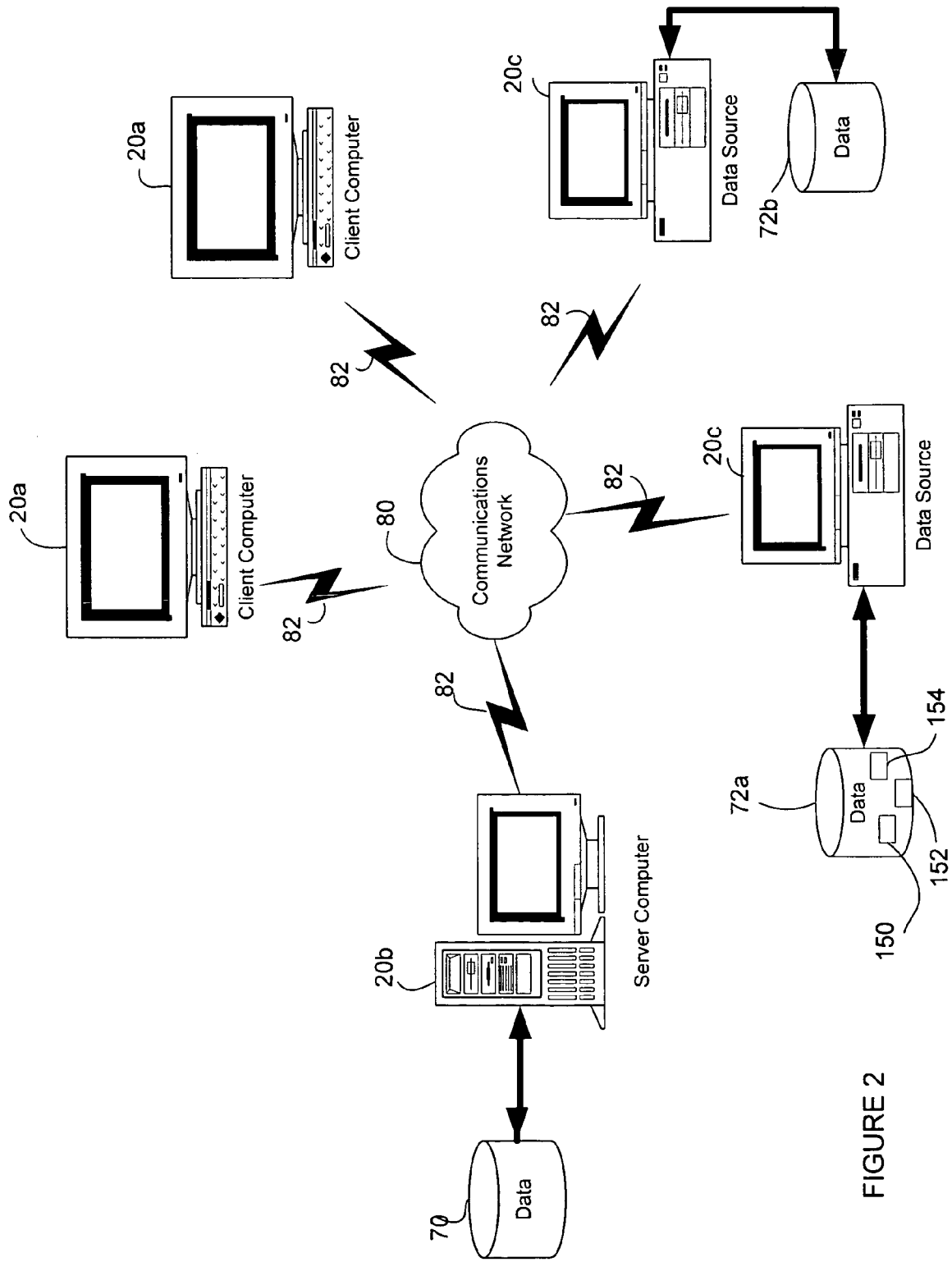
FIG. 2 is a schematic diagram representing a network in which aspects of the present invention may be incorporated.

FIG. 2 illustrates an exemplary network environment in which aspects of the present invention may be employed. Of course, actual network and database environments can be arranged in a variety of configurations; however, the exemplary environment shown here provides a framework for understanding the type of environment in which the present invention operates.

The network may include client computers 20a, a server computer 20b, data source computers 20c, and databases 70, 72a, and 72b. The client computers 20a and the data source computers 20c are in electronic communication with the server computer 20b via communications network 80, e.g., an Intranet. Client computers 20a and data source computers 20c are connected to the communications network by way of communications interfaces 82. Communications interfaces 82 can be any one of the well-known communications interfaces such as Ethernet connections, modem connections, and so on.

Server computer 20b provides management of database 70 by way of database server system software, described more fully below. As such, server 20b acts as a storehouse of data from a variety of data sources and provides that data to a variety of data consumers.

In the example of FIG. 2, data sources are provided by data source computers 20c. Data source computers 20c communicate data to server computer 20b via communications network 80, which may be a LAN, WAN, Intranet, Internet, or the like. Data source computers 20c store data locally in databases 72a, 72b, which may be relational database servers, excel spreadsheets, files, or the like. For example, database 72a shows data stored in tables 150, 152, and 154. The data provided by data sources 20c is combined and stored in a large database such as a data warehouse maintained by server 20b.

Client computers 20a that desire to use the data stored by server computer 20b can access the database 70 via communications network 80. Client computers 20a request the data by way of SQL queries (e.g., update, insert, and delete) on the data stored in database 70.

COM and Managed Code (.NET)

To manage the complexity of long computer programs, computer programmers often adopt object-oriented programming techniques. With these techniques, a computer program is organized as multiple smaller modules called objects. An object is a unit of code comprising routines and/or data, and is generally thought of as a discrete entity. These objects perform specified functions and interact with other objects in pre-defined ways. Objects communicate with each other through interfaces. Each object may have multiple interfaces. An interface exposes and defines access to the object's public routines and data. Put another way, an interface can be considered as the definition of an expected behavior and expected responsibilities. One of the advantages to interfaces is that a client object can continue to access the methods of a server object that are exposed through the interface, regardless of whether the underlying code in the object is updated or changed for another reason.

One of the primary benefits of object-oriented programming is that the objects can be easily and affordably adapted to meet new needs by combining them in a modular fashion. The structural foundation for an object-oriented language is the object model. The Component Object Model (COM) produced by Microsoft Corporation of Redmond, Wash., is an example of an object model.

COM is a software architecture for creating and using objects, which makes software easier to write and reuse. In COM, an object is some piece of compiled code that provides some service to the rest of the system. Services are used in a standard way, regardless of location. COM allows an object to expose its functionality to other objects and to host applications. In this manner, COM allows objects made by different software vendors to be combined into a variety of applications.

COM defines a binary standard for component interoperability (e.g., for function calling between components) and is not dependent on any particular programming language. In this manner, binary executables are able to interoperate. Thus, COM can be used with any programming language that uses a binary standard, such as Visual Basic, JAVA, and C++.

In COM, applications interact with each other and with the system through collections of functions called interfaces. A COM interface is a strongly-typed contract between software components to provide a small but useful set of semantically related operations or methods. Thus, in COM, an interface is a related group of functions and is the binary standard through which objects communicate. As noted above, an object can, and typically does, implement more than one interface. Every interface has its own interface, a globally unique ID (GUID). A GUID is an integer (typically a 128-bit integer) that is guaranteed to be unique in the world across space and time. GUIDs are used to identify every interface and every component object class. Human-readable names are assigned only for convenience and are locally scoped. This helps to ensure that COM components do not accidentally connect to the wrong component, interface, or method, even in networks with millions of component objects. Thus, developers create their own GUIDs when they develop component objects and custom interfaces. Through the use of "defines", developers do not need to be exposed to the actual (128-bit) GUID. Thus, if a developer creates a new interface, he must also create a new identifier for that interface. When a developer uses an interface, he must use the identifier for the interface to request a pointer to the interface. This eliminates naming conflicts that would result in runtime failure. It should also be noted that COM interfaces are not versioned, which avoids version conflicts between new and old components. A new version of an interface is an entirely new interface and is assigned a new GUID.

While COM objects have been fundamental to programming for many years, applications designed for use with other platforms, such as the managed code of the .NET platform produced by Microsoft Corporation of Redmond, Wash., offer many advantages. Managed code contains metadata (data about data) that is used by the common language runtime (CLR). In comparison, COM provides a binary standard between two objects, whereas the use of managed code in .NET comprises a logical standard and not a binary standard and accordingly is a different platform than COM. Consequently, each standard has its own requirements and restrictions regarding the development of code, and certain conflicts between these standards have given rise to certain shortcomings in the art which the present invention addresses, namely in the area of code reuse.

Components and Interfaces

In COM, an object is some piece of compiled code that provides some service to the rest of the system. As used herein, a COM object may also be referred to as a "component object" or simply a "component" in order to avoid confusing COM objects with the source-code object-oriented programming (OOP) "objects" such as those defined in C++. In COM, applications interact with each other and with the system through collections of functions called interfaces. A COM interface is a strongly-typed contract between software components to provide a small but useful set of semantically related operations (methods). An interface is the definition of an expected behavior and expected responsibilities. In COM, interface names generally begin with "I" by convention. Unlike other kinds of objects outside the COM context, COM objects support a base interface called IUnknown along with any combination of other interfaces depending on what functionality the component object chooses to expose.

Component objects usually have some associated data but, unlike C++ objects, a given component will never have direct access to another component in its entirety. Instead, components always access other components through interface pointers. This is a primary architectural feature of the Component Object Model because it allows COM to completely preserve encapsulation of data and processing, a fundamental requirement of a true component software standard. It also allows for transparent remoting (cross-process calling) since all data access is through methods that can exist in a proxy object that forwards the request and vectors back the response. Moreover, a pointer to a component is really a pointer to one of the interfaces that the component implements; this means that you can use a component pointer only to call a method, but not to modify data.

A component can, and typically does, implement more than one interface—that is, the class has more than one set of services to provide. For example, a class might support the ability to exchange data with clients as well as the ability to save its persistent state information (the data it would need to reload to return to its current state) into a file at the client's request. Each of these abilities is expressed through a different interface.

Figure 4:
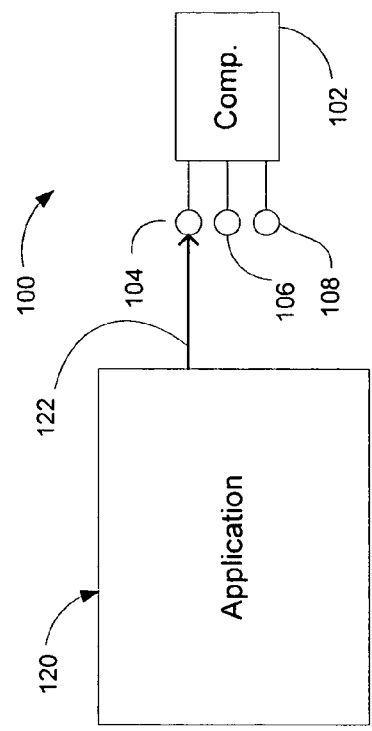
FIG. 4 is a graphical representation of a client application using an interface pointer to access a component via an interface.
Figure 3:
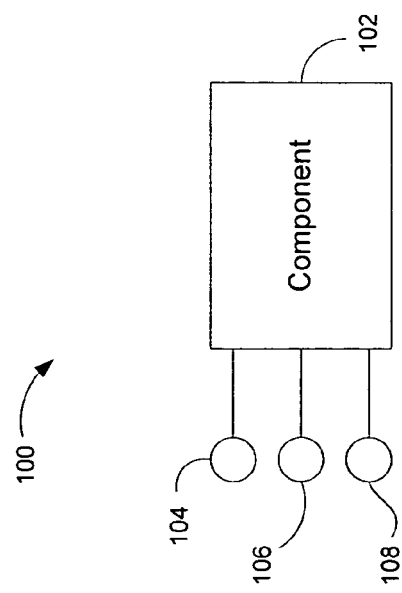
FIG. 3 is a graphical representation of an component with multiple interfaces.
Figure 5:
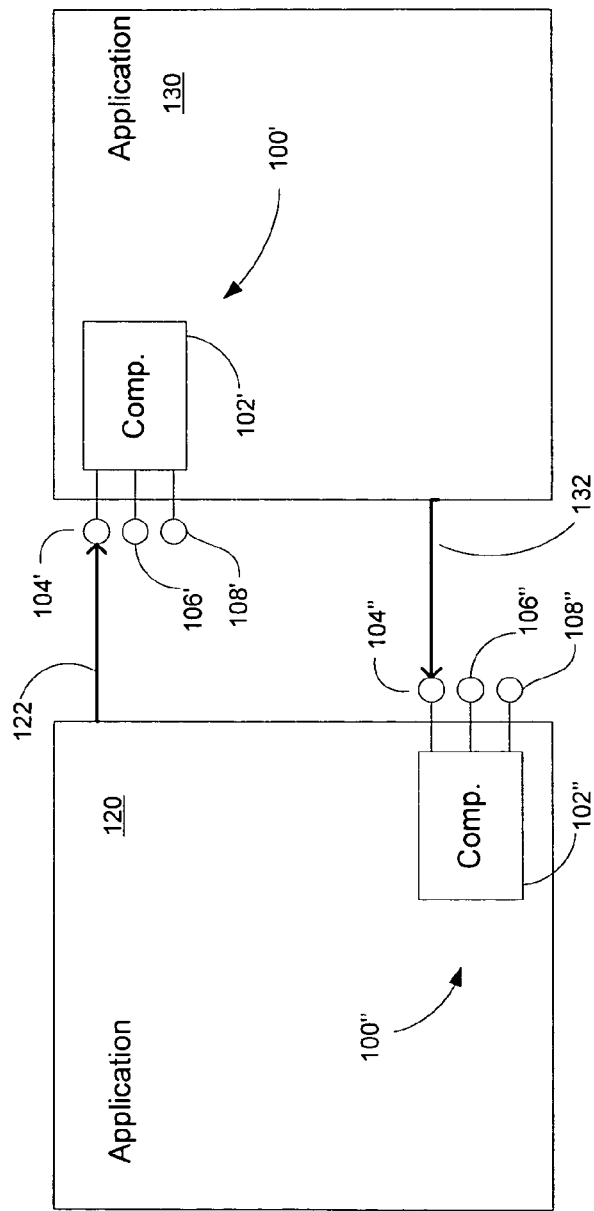
FIG. 5 is a graphical representation of a client application using an interface pointer to access a component of another client application via the components' interface, and where the other client application is also using an interface pointer to access a component of the first client application via the components' interface.

FIG. 3 is a graphical representation of an component with multiple interfaces. The body of the component 102, in which the methods of the component 100 are contained, exposes three interfaces 104, 106, and 108, where each interface corresponds to different abilities expressed by the methods (not shown) in the body of the component 102. As shown, the body of the component 102 is opaque (hiding the specific methods or functions therein) because an application calling the component via an interface need not know anything about the internal structure or implementation of the body of the component. FIG. 4 is a graphical representation of a client application 120 using an interface pointer 122 to access the component 100 via an interface 104. FIG. 5 is a graphical representation of a client application 120 using an interface pointer 122 to access a component 100' of another client application 130 via the components' interface 104', and where the other client application 130 is also using an interface pointer 132 to access a component 100" of the first client application 120 via the components' interface 104".

In regard to the opaque nature of components (specifically bodies 102, 102', and 102"), it is important to note that the key principle in building reusable components is the concept of "black-box reuse," which means the piece of code attempting to reuse another component knows nothing—and does not need to know anything—about the internal structure or implementation of the component being used. In other words, an application attempting to reuse a component depends upon the behavior of the component and not the exact implementation.

Reuse and Extending Objects in Managed Code

In COM, like other object-oriented programming models, a component can reuse and extend functionality from other components. The extending component, herein referred to as a container, thereby gains the functionality of the extended component, herein referred to as a member. Such reuse, in turn, speeds up program development and is one of the key benefits of software componentization. COM supports two forms of object reuse: aggregation and delegation.

Figure 6:
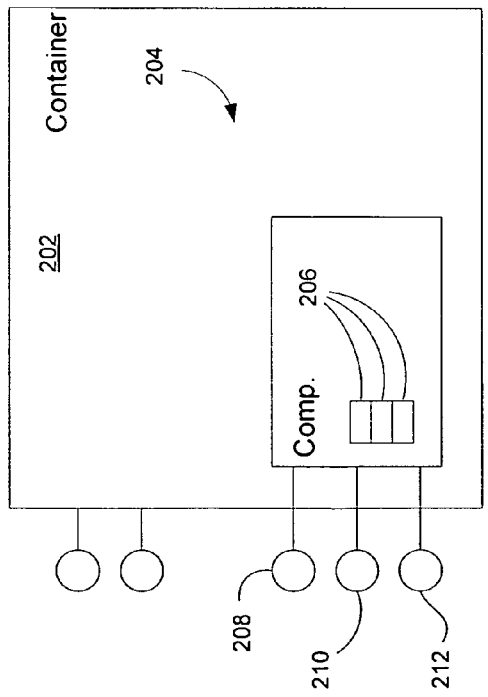
FIG. 6 illustrates the principle of aggregation, or implementation reuse, in regard to COM object components.

FIG. 6 illustrates the principle of aggregation, in regard to COM object components. Herein a container 202 fully encapsulates a member 204 such that the methods 206 of the member 204 are directly incorporated into the container 202 which can then utilize these methods 206 via the member's 204 interface(s) 208, 210, and 212, thereby giving the container 202 the member 204's functionality.

Figure 7:
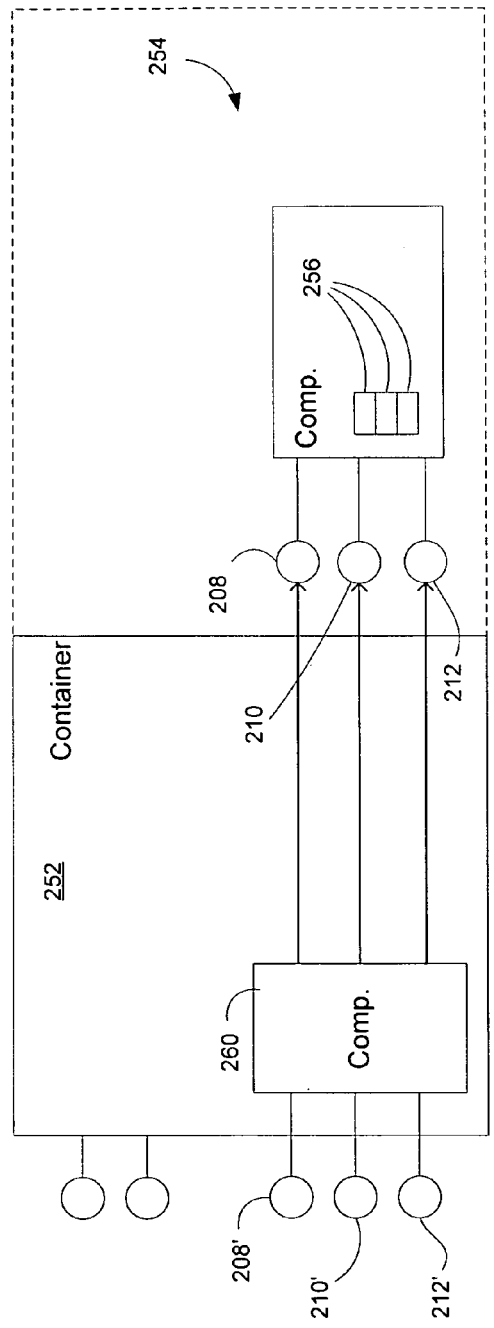
FIG. 7 illustrates the principle of delegation, or interface reuse, in regard to COM component objects.

FIG. 7 illustrates the principle of delegation, in regard to COM component objects. Herein a container 252 virtually encapsulates a member 254 such that the methods 256 of the member 254 are indirectly incorporated into the container 252 which, via an internal method 260 which explicitly delegates the calls to the container to the appropriate member interface(s) 208, 210, and 212, enable the container 252 to utilize these methods 256 via the member's 204 interface(s) 208, 210, and 212, thereby giving the container 252 the ability to call the member's 254 method functionality.

Figure 8:
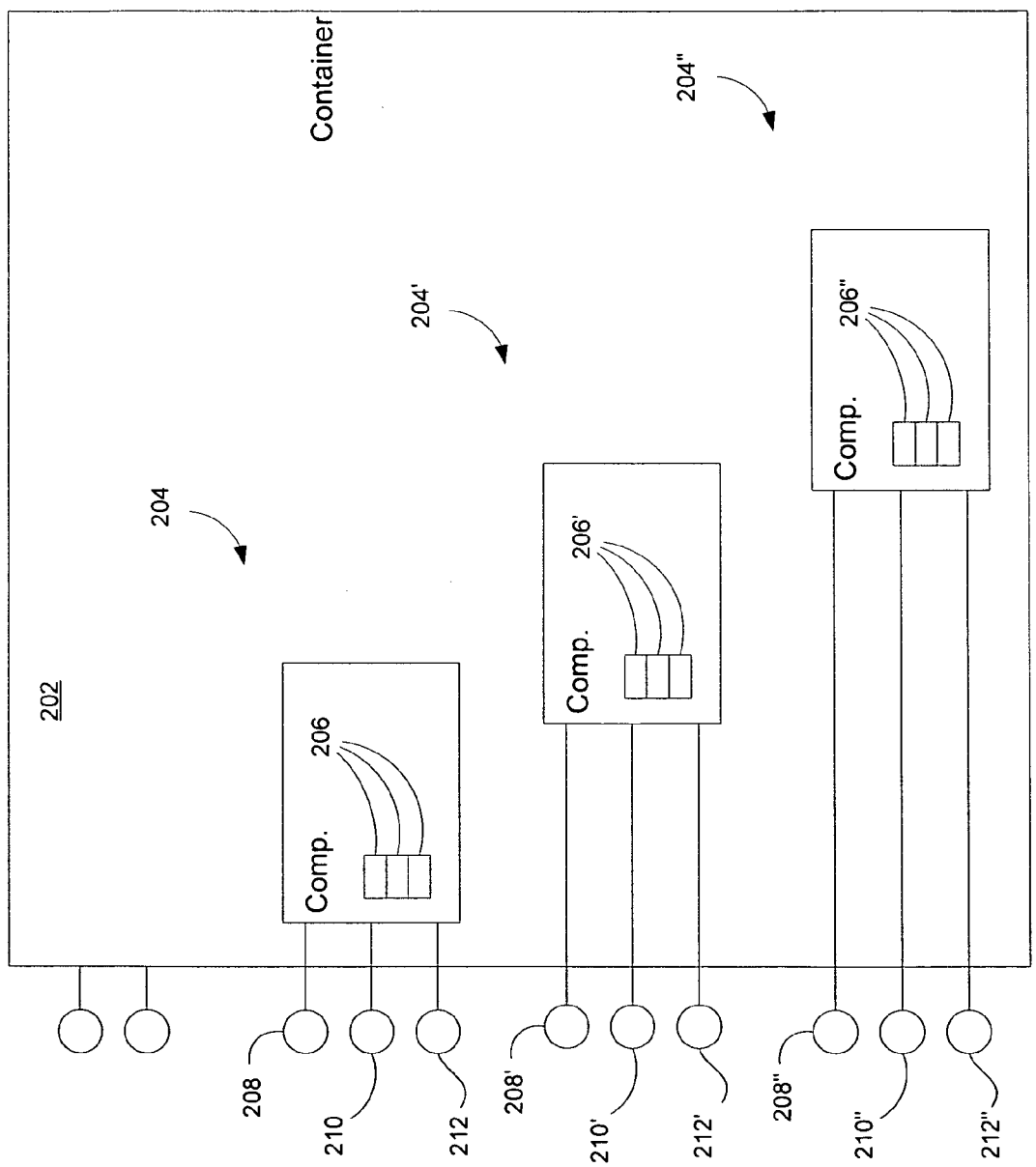
FIG. 8 illustrates multiple implementation reuse for an aggregation approach.
Figure 9:
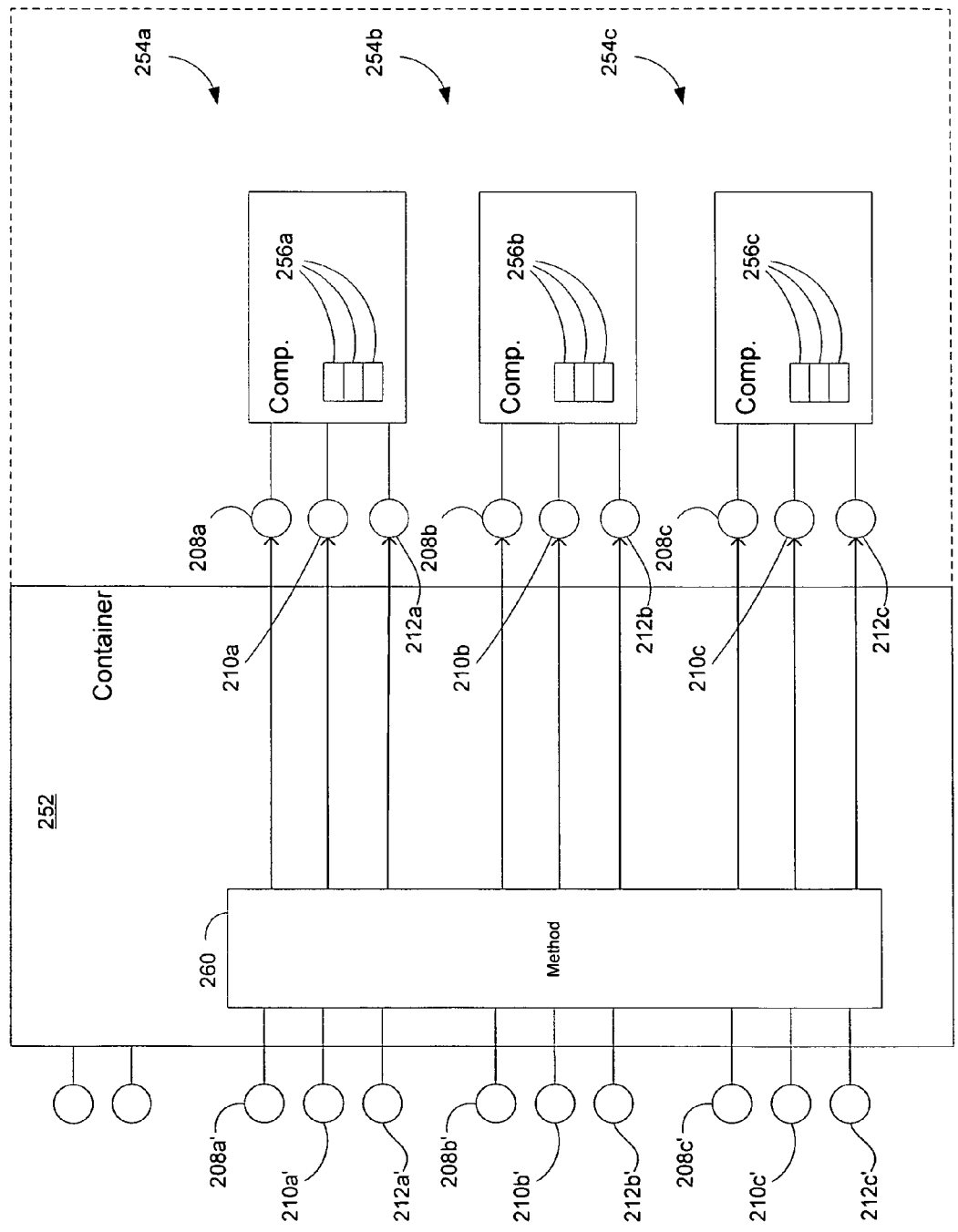
FIG. 9 illustrates multiple implementation reuse for a delegation approach.

In regard to both aggregation and delegation, it is often desirable for a single container to reuse and extend functionality from more than one member, an approach known generally as multiple inheritance. FIG. 8, which is partially based on FIG. 6, illustrates the aggregation approach, while FIG. 9, which is based on FIG. 7, illustrates the delegation approach. Therefore, as demonstrated in FIGS. 6-9, each method (aggregation and delegation) can extend single object members or two or more object members into the logical construct of a container.

Managed code (that is, code developed for Microsoft's .NET framework) does not allow multiple implementation inheritance, a specific type of multiple implementation reuse, and thus, in the context of multiple inheritance, managed code cannot aggregate multiple objects within a single container object directly in this way. Instead, managed code objects can only achieve multiple inheritance using the delegation technique (that is, multiple interface inheritance), or indirect inheritance. This delegation technique, however, results in unavoidable code clutter due to the use of the internal method 260 shown in FIG. 9.

Dynamically Created Type Aggregation

Figure 10:
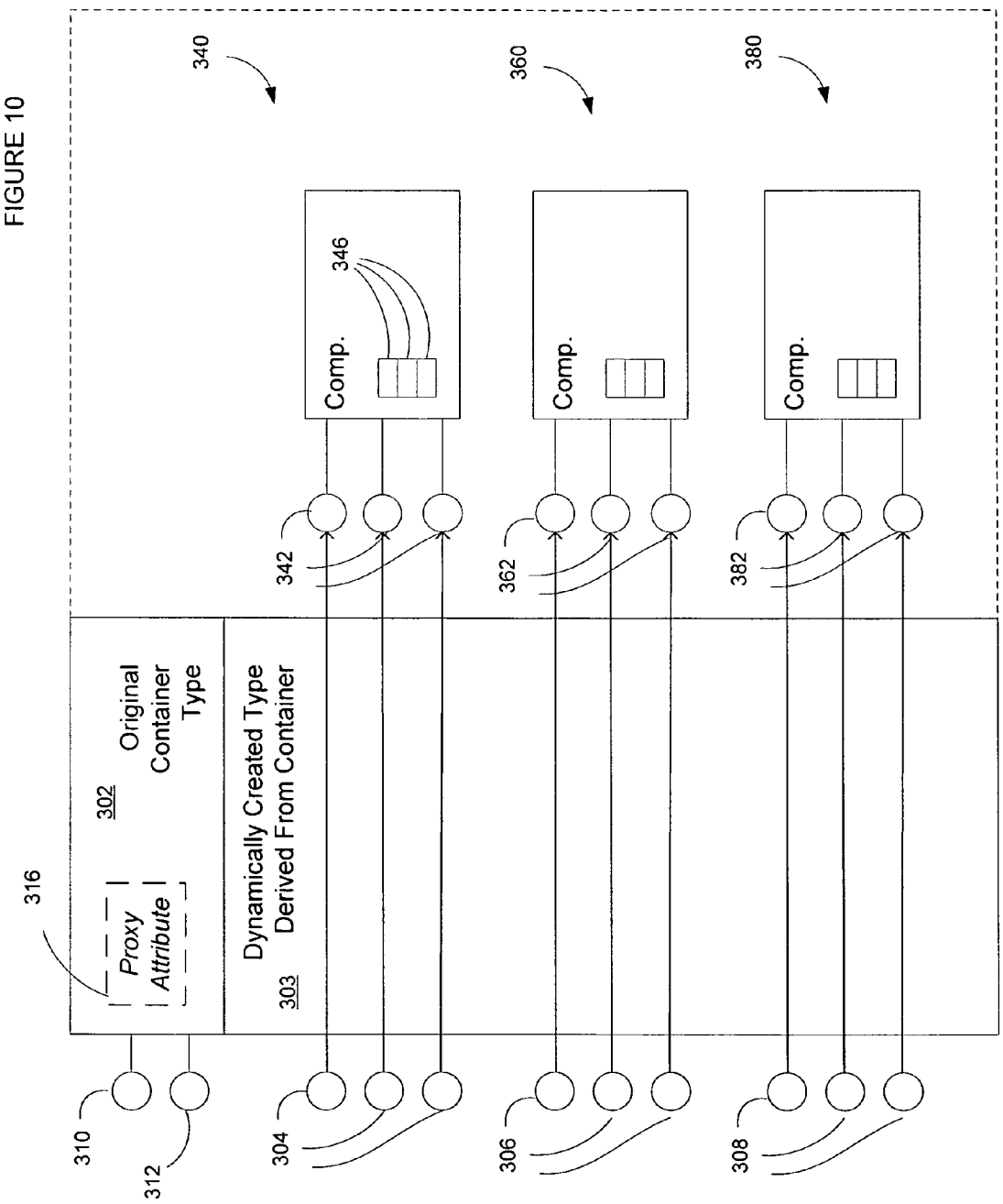
FIG. 10 is an illustration of one embodiment of the present invention for automatic interface delegation.

Component reuse can also be accomplished by the utilization by the container of a dynamically created type that, upon instantiation, automatically includes among its own interfaces direct connections to the interfaces of the members used in the container. FIG. 10 is an illustration of one embodiment of the present invention for automatic interface delegation using a direct delegation container. In the figure, a dynamically created type 403 derived from an original container type 402 uses direct member interface groups 304, 306, and 308, in addition to its own interfaces 310 and 312, and a proxy attribute 316. The direct member interface groups 304, 306, and 308 act as conduits for calls directly to members 340, 360, and 380 via their respective interface groups 342, 362, and 382. Because these direct interfaces 304, 306, and 308 do not require writing code for an internal method to delegate calls to the members and instead are handled by the dynamically created type's delegation logic, code clutter is eliminated. The types described by this method are then instantiated as appropriate.

A method for implementing the invention as managed code is for the container object (referred to as a "dynamically created type aggregation container") to be decorated with a proxy attribute and additional attributes specifying helper classes for various interface implementations. Then, when the container object is instantiated at runtime, the proxy attribute intercepts the instantiation and returns an instance of new type dynamically created at runtime that derives from the container type and implements interfaces by delegating to its members corresponding to the helper classes. The container object can support both managed and unmanaged (traditional COM) clients.

Proxy Interception Aggregation

In addition to runtime interface delegation, component reuse in managed code can be achieved by decorating the container object with a proxy attribute that allows the container object to be intercepted, and the attributes that specify the objects to be extended within the container object so that when the container object is instantiated at runtime, a proxy object is returned which contains a lookup table that maps interfaces to the extended objects within the component. The proxy object intercepts all calls to the container object and redirects them appropriately to the proxy objects corresponding to the extended objects, which may in turn redirect calls as appropriate. This scheme allows for general implementation reuse that is not restricted to interface implementation reuse. When restricted to interface implementation reuse, the container object supports managed and unmanaged (traditional COM) clients. When the container object uses this scheme for general implementation reuse (i.e. not restricted to interface implementation reuse), only managed clients can access aggregated functionality not exposed through interfaces (since unmanaged (traditional COM) clients can access functionality only through interfaces).

Figure 11:
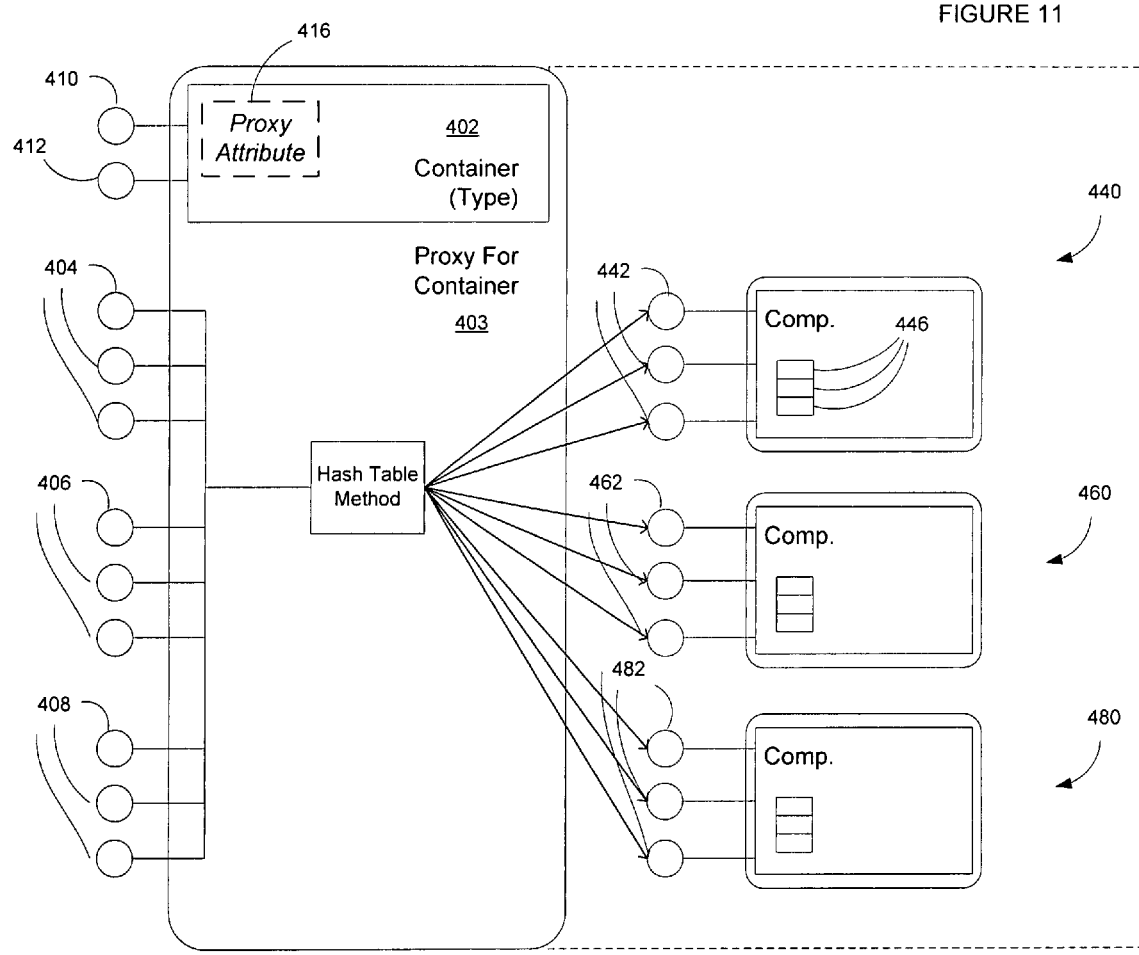
FIG. 11 is an illustration of one embodiment of the present invention for virtual aggregation.

FIG. 11 is an illustration of one embodiment of the present invention for aggregation using an aggregation container (referred to as a "proxy interception aggregation container"). In the figure, an instantiated proxy 403 for a container type 402 uses indirect member interface groups 404, 406, and 408, in addition to its own interfaces 410 and 412, and a proxy attribute 416. The direct member interface groups 404, 406, and 408 act as conduits for calls indirectly to members 440, 460, and 480 via congregation to a hash table method 420 of the container 402 that, in turn, redirects the calls to their respective interface groups 442, 462, and 482. Because these indirect interface groups 404, 406, and 408 do not require the use of an internal method to delegate calls to the members, but instead uses a simplified hash-table method 420, code clutter is eliminated.

A method for implementing the invention as managed code is for the container object to be decorated with a proxy attribute and additional attributes specifying helper classes for various interface implementations. Then, when the container object is instantiated at runtime, the proxy attribute intercepts the instantiation and creates and returns an a proxy associated with the container. This proxy then contains a lookup table that maps interfaces to helper object instances. By appropriate redirection through the proxy, we, managed aggregation is achieved.

CONCLUSION

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific operating systems, are herein contemplated, especially as the number of wireless networked devices continues to proliferate. Therefore, the present invention should not be limited to any single embodiment, but rather construed in breadth and scope in accordance with the appended claims.

What is claimed:

1. A method for implementing a proxy interception aggregation container, said method comprising:
    decorating a container object with:
        a plurality of container object attributes;
        a proxy attribute, wherein the proxy attribute allows the original container object to be intercepted;
        a plurality of interfaces that interface with a plurality of members to be extended by the container object, wherein the interfaces comprise container interfaces and indirect member interfaces, the indirect member interfaces not requiring use of an internal method to delegate calls to the member; and
    upon an instantiation of the container object at runtime, the instantiation being intercepted by the proxy attribute, returning a proxy object that intercepts all calls to the container and redirects the calls to the a proxy object corresponding to a member that further redirects the calls, wherein the proxy object comprises:
    a hash table, the hash table mapping interfaces to the members within the container.

2. The method of claim 1 wherein the method is implemented in a Component Object Model.

3. The method of claim 1 wherein the method is implemented in managed code.

4. A computer system comprising a processor means, a memory means, and a storage means including executable instructions for instructing the processor to execute the following steps:
    decorate a container object with:
        a plurality of container object attributes;
        a proxy attribute, wherein the proxy attribute allows the original container object to be intercepted;
        a plurality of interfaces that interface with a plurality of members to be extended by the container object, wherein the interfaces comprise container interfaces and indirect member interfaces, the indirect member interfaces not requiring use of an internal method to delegate calls to the member; and
    instantiate the container object at runtime, the instantiation being intercepted by the proxy attribute, returning a proxy object that intercepts all calls to the container and redirects the calls to the a proxy object corresponding to a member that further redirects the calls, wherein the proxy object comprises:
    a hash table, the hash table mapping interfaces to the members within the container.

* * * * *